United States Patent [19]

Starkey

[11] Patent Number: 4,602,545

[45] Date of Patent: Jul. 29, 1986

[54] DIGITAL SIGNAL GENERATOR FOR MUSICAL NOTES

[75] Inventor: David T. Starkey, San Diego, Calif.

[73] Assignee: CBS Inc., New York, N.Y.

[21] Appl. No.: 694,373

[22] Filed: Jan. 24, 1985

[51] Int. Cl.[4] .......................... G10H 7/00; G06F 7/38

[52] U.S. Cl. ...................................... 84/1.01; 364/723

[58] Field of Search ................. 84/1.01, 1.28; 364/723

[56] References Cited

U.S. PATENT DOCUMENTS

| | | | |
|---|---|---|---|
| 4,202,234 | 5/1980 | Comerford | 84/1.01 |
| 4,205,575 | 6/1980 | Hoskinson et al. | 84/1.01 |
| 4,224,856 | 9/1980 | Ando et al. | 84/1.19 |
| 4,334,281 | 6/1982 | Imazeki et al. | 364/723 |
| 4,536,853 | 8/1985 | Kawamoto et al. | 84/1.01 X |
| 4,539,884 | 9/1985 | Aoki | 84/1.01 |

*Primary Examiner*—William B. Perkey

*Attorney, Agent, or Firm*—Spencer E. Olson

[57] ABSTRACT

A digital tone generator for a keyboard electronic musical instrument is described. The generator is of the waveshape memory type and repetitively interpolates between successive stored sample points thereby to effectively multiply the number of samples representing the waveshape so as to produce an output tone signal having reduced quantization error. Envelope errors are minimized by using cascade-connected multiplying digital-to-analog converters for multiplying the waveshapes derived from the interpolation with digital signals representative of an envelope waveshape. The system also includes a novel modification of a known multiplying digital-to-analog converter which greatly increases its speed of operation and makes possible the generation of clean output tone signals at the extremely high bit rates required to accomplish the interpolation.

8 Claims, 7 Drawing Figures

$V_o = \frac{W_x N}{256} = \frac{N}{256} \sin wt$ $V_1\left(\frac{W_x N}{256}\right)\left(\frac{N}{256}\right) = \frac{N^2}{65536} \sin wt$

| | Vo (1 VOLT IN) | | V1 (1 VOLT IN) | |
|---|---|---|---|---|
| | 8-BIT LINEAR ATTENUATION dB | AMPLITUDE Mv | $X^2$ 8-BIT ALGORITHM ATTENUATION dB | AMPLITUDE Mv |
| 0 | ∞ | 0 | ∞ | 0 |
| 1 | 48 | 3.9 | 96 | .015 |
| 2 | 42 | 7.8 | 84 | .061 |
| 3 | 38 | 11.2 | 77 | .13 |
| 4 | 36 | 15.6 | 72 | .244 |
| 5 | 34 | 19 | 68 | .381 |
| 6 | 32 | 23 | 65 | .549 |
| 7 | 31 | 27 | 62 | .748 |
| 8 | 30 | 31 | 60 | .977 |
| 9 | 29 | 35 | 58 | 1.23 |
| 10 | 29 | 39 | 56 | 1.5 |
| 11 | 28 | 43 | 54 | 1.8 |
| 12 | 27 | 47 | 53 | 2.2 |
| 13 | 26 | 51 | 51 | 2.5 |
| 14 | 25 | 55 | 50 | 2.9 |
| 15 | 25 | 59 | 49 | 3.4 |
| 16 | | | 48 | 3.9 |
| 17 | | | 47 | 4.4 |
| ⋮ | | | | |
| 255 | | 996 | | |

DIGITAL SIGNAL GENERATOR FOR MUSICAL NOTES

BACKGROUND OF THE INVENTION

This invention relates to keyboard electronic musical instruments and, more particularly, to a digital tone generating system of the waveshape memory type.

In known keyboard electronic musical instruments of the waveshape memory type, memories having the required waveshapes stored therein are read out by a read-out address signal corresponding to a depressed key of the keyboard, the resulting derived waveshapes are multiplied with an envelope wave which controls the amplitude of the tone to be produced, and the resulting signal converted to analog form by a digital-to-analog converter. Examples of note generators of the waveshape memory type are described in U.S. Pat. Nos. 4,202,234 and 4,224,856, two of many patents directed to various aspects of digital tone generation.

In prior note generators of this type the address signal typically is eight bits in length, or capable of addressing one of 256 samples, and usually some of the bits, although having significance, are treated as if they were insignificant and discarded. As a consequence, the waveshape read out of memory contains quantization errors which can result in audible noise in the generated tone signal. The source and nature of the error will be seen from examination of FIG. 1 which illustrates the digitizing of a sinewave by classic digital-to-analog conversion techniques wherein the value of each sample is considered valid from each sampling time point until the next, whereupon switching to the next value occurs and held until the next successive sampling time point. It is seen that this process produces a stepped error function; although the use in FIG. 1 of only sixteen sample points emphasizes the error function and is, of course, much less pronounced when 256 samples are used, the error nonetheless exists and adversely affects the musical quality of the generated tone signals. The signal quality could be improved by making the steps in the error function smaller, but this would be at the expense of increased complexity and cost of longer wave tables. Accordingly, a primary object of the present invention is to provide a musical note generator of the waveshape memory type in which the error function is reduced as compared to prior systems, yet requires no more memory capacity.

SUMMARY OF THE INVENTION

Briefly, the tone generating system, according to the present invention, utilizes waveshape storage means having a memory capacity comparable to that of prior systems and interpolates between successive sample points thereby to effectively multiply the number of samples representing the waveshape so as to produce an output signal having reduced quantization error. By utilizing a barrel interpolation technique, and interpolating to seven bits, a system having 256 stored samples has an effective capacity equal to 256×128 or 32,768 samples, which greatly reduces the error at each "step." Interpolation is accomplished with a novel modification of a known barrel multiplication technique.

In a preferred embodiment, the interpolation system is time-shapred to provide thirty-two individual "oscillators," each capable of providing a distinct waveshape and frequency in response to operation of tone selection means. The system further includes digital-to-analog conversion means for converting the multiplicity of different waveshapes to corresponding musical tones. Envelope errors are minimized by utilizing cascaded multiplying digital-to-analog converters for multiplying the waveshapes derived from the waveshape memory with an envelope waveshape. In order to obtain clean output tone signals at the extremely high bit rates required to accomplish the aforementioned interpolation and to provide thirty-two separate "oscillators," the system includes a novel modification of a commercially available type of multiplying digital-to-analog converter which greatly increases its speed of operation.

Other objects, features and advantages of the invention, and a better understanding of its construction and operation, will be had from the following detailed description of a preferred embodiment, when read in conjunction with the accompanying drawings.

DESCRIPTION OF PREFERRED EMBODIMENT

Figure 2:
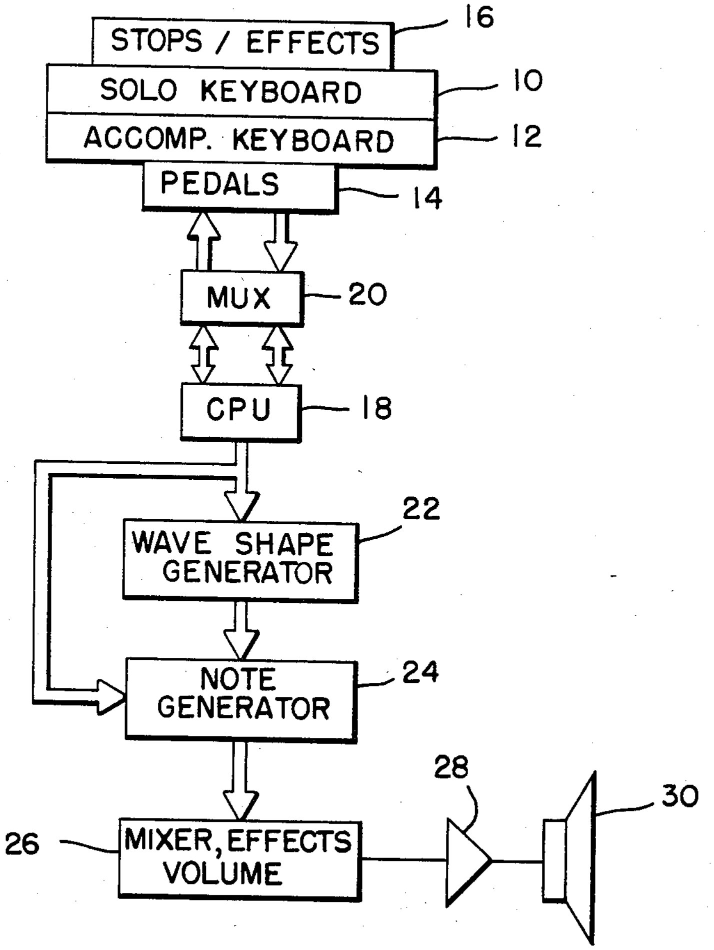
FIG. 2 is a block diagram of an electronic organ embodying the invention.

With reference to FIG. 2, an electronic organ systems embodying the invention will first be considered in outline. The organ console conventionally includes two manual keyboards 10 and 12 and a pedal keyboard 14, each with associated stops and effects controls represented by block 16. The system may also include couplers for causing corresponding keys on different keyboards or octavely-related keys to operate together when any one of them is operated. In a pipe organ, which the present system is intended to simulate, the operation of a stop control makes ready a rank of pipes chosen to define a distinctive set of harmonic structures. When a key is depressed, at least one pipe of the set which relates to a notation of that key is brought into action; the fundamental pitch may correspond to the notation of the key which was pressed or may be displaced from it in some harmonic relationship. The simulation of this process in an electronic organ first requires the issuance from the console of a selection signal to indicate a change in the identity of a key or stop which is in use. The stop selection defines a set of harmonic structures, and the selection of a key identifies both the required pitch and the correct harmonic structure within the set. The synthesis of an appropriate complex waveform and its reproduction at the required fundamental pitch can then be instructed. These requirements are satisfied in the system of FIG. 2 by the combination of a programmed computer 18 to which the keyboards and associated stops and effects controls are coupled through a multiplexer 20 in conventional manner consistent with instructions set forth by the manufacturer of the computer; in a preferred implementation, the microprocessor used is a Model Z-80 manufactured by ZILOG Corporation.

Multiplexer 20 includes means for interrogating the status of all of the key switch representing contacts of the keyboards and pedals and writing appropriate selection signals into the memory of computer 18 when any change of status resulting from tab or key operation is detected. Computer 18 then issues instructions to a digital waveshape generator 22 to sample a waveform stored therein at the rate required to assign the desired fundamental pitch to the note corresponding to the operated key. Further instructions from computer 18 initiate the setting of envelope sample amplitudes which are applied to a note generating circuit 24, which includes cascaded multiplying digital-to-analog converters for multiplying the envelope with the waveshape derived from generator 22, to produce the desired note. The system being capable of essentially simultaneously generating thirty-two separate notes in a time-shared fashion, the output from note generator 24 is applied to a demultiplexer (not shown in FIG. 2) which outputs the tone signals to conventional audio output circuitry, typically including mixing, effects and volume control circuitry 26, a power amplifier 28 and one or more loudspeakers 30.

Figure 1:
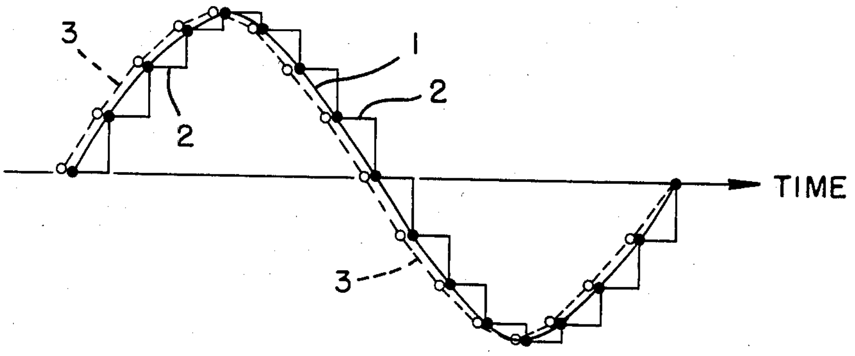
FIG. 1, to which reference has already been made, is a sketch which illustrates the difference between prior digitizing techniques and the present interpolation approach of generating a waveshape.

Before proceeding with a detailed description of waveshape generator 22 and note generator 24, wherein the inventive features reside, reference is again made to FIG. 1 which graphically illustrates the difference between the operations of the present system, which interpolates between two successive sample values so as to effectively increase the number of samples in the wave table, and the conventional look-up table utilized in the prior art. Utilizing a sine wave 1 as the sampled waveform (not the usual stored waveshape in a typical organ system) the stepped waveform 2 shows the result of converting sixteen uniformly-spaced stored samples representing the waveform using classic digital-to-analog sampling techniques. That is, the amplitude value at each sample point is considered valid throughout the sampling interval and then switches to the amplitude value at the next sampling point, and so on. The resulting stepped waveform departs significantly from the sinusoidal wave, and although the approximation would be better if the number of sampling points were increased, it would still contain a stepped error function which results in unwanted harmonic distortion.

In accordance with the interpolation technique of the invention, it can be considered that successive stored samples are connected by straight-line segments 3, shown by dotted lines which have been displaced slightly from the solid line sinewave to avoid confusion. It is seen that even with the limited number of sample values employed in the example, the dotted line curve closely approximates the sinewave represented by the stored samples. Thus, it is obvious that if the waveform were represented by a larger number of samples, for example the 256 samples readiy obtainable from commercially available random access memories (RAM), the dotted line approximation would very nearly follow the sinewave. The error is further minimized, in accordance with the invention, by interpolating between successive sample points as demanded by frequency information instructions from the computer, which has the effect of increasing the number of sample values and improving the approximation.

Figures 3, 3A, 3B:
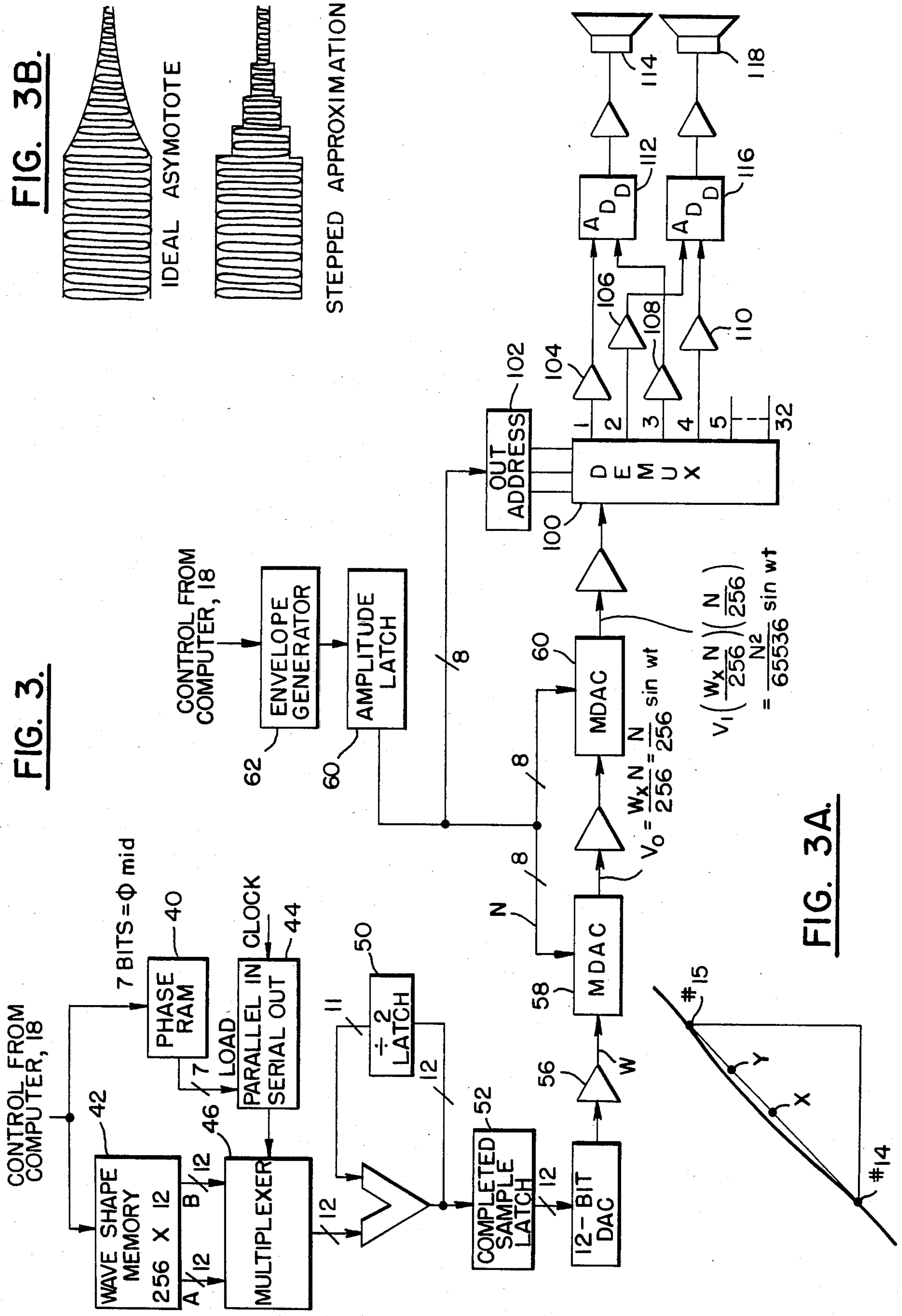
FIG. 3 is a block diagram of a musical note generator for the electronic organ of FIG. 2.
FIG. 3A is a sketch useful to the understanding of the operation of the interpolator portion of the note generator.
FIG. 3B are waveforms illustrating the improvement in output signal obtained by cascading multiplying digital-to-analog converters.

The general function of the waveshape generator having been described, the operation of the components of the system that achieve the function will now be considered in more detail with reference to FIG. 3. Contacts for all the keys, stops and auxiliary controls provided in the console may total about two hundred fifty, the exact number being dependent on the size and complexity of the instrument. The address and status of every contact is stored in the memory of the microprocessor 18 and scanned for any change in status at a rate transparent to the user (approximately ten milliseconds). The response of computer 18 to scan data indicating that a change in the console selection signal has been made is to draw upon the appropriate program for the synthesis of the required complex waveshape in waveshape generator 22, the preferred implementation of which is shown in block diagram form at the upper left-hand portion of FIG. 3.

Frequency information signals corresponding to the basic frequencies of musical tones to be generated which, in turn, correspond to the tonal pitch of an operated key, are coupled from the computer memory to the input of a phase random access memory (RAM) 40 which accumulates fifteen bits of significant phase information, eight bits of which are used to fetch one or the other of a "previous" amplitude sample or a "next" amplitude sample from a waveshape memory 42. The waveshape memory 42, which may take the form of a 256×12-bit RAM, stores 256 sample values of a previously developed musical tone wave shape which includes a large number of higher harmonic components to provide the desired tonal quality. A parallel-in-series-out (PISO) register 44 is loaded with seven bits of data from phase RAM 40 which, under clocked control first couples the least significant of the seven bits to the control input C of a multiplexer 46 which, in turn, applies read-out address signals to memory 42. The barrel interpolator further includes an adder 48 connected to receive at a first input a signal from the output of multiplexer 46, a clocked "divide-by-two" latch 50 connected between the output of adder 48 and a second input to the adder, and a "completed sample" latch 52.

In operation, the output of adder 48 is divided by two in latch 50, the twelve bits of the signal being shifted as they are transferred from the output of the adder into the latch, and the output of the latch, which effectively is the input divided by two, is coupled back into the second input of the adder. The effect of this operation is to add one-half of the adder output produced by the previous cycle of the interpolator (the cycle being timed by the clocked register 44) to a new sample coming into the adder from multiplexer 46. Of the 256 amplitude samples stored in memory 42, half of them may be classified as "previous" samples (hereinafter designated "A") and the other one hundred twenty eight as "next" samples (designated "B"); for every "previous" entry "A", there is a "next" entry "B" or one hundred twenty eight combinations of A and B. Although FIG. 3 shows both signals A and B applied to the multiplexer 46, only one of them, as determined by the output of register 44, can appear at any time at the output of the multiplexer. Of the fifteen bits of significant phase information stored in phase RAM 40, the eight most significant bits are used to derive from memory 42 the "previous" sample and the "next" sample; that is, if the upper eight bits of the data stored in the phase accumulator calls for reading sample No. 14, for example, as the "previous" sample, sample location No. 15 would be addressed as the "next" sample. Interpolation between sample No. 14 and sample No. 15 is accomplished by cycling the interpolator seven times under control of the remaining seven bits in the phase accumulator, which are characterized in the drawing as $\phi_{mid}$.

More particularly, and with reference now also to FIG. 3A, the least significant of the seven bits is first applied to the control input C of multiplexer 46, and if the value of that bit is a "zero", the multiplexer applies a "previous" sample (in this case, sample No. 14) to the input of adder 48; this sample may appear on the waveform represented by the stored samples at the location depicted in FIG. 3A. If, on the other hand, the value of that first bit is a "1", the "next" sample (i.e., No. 15) will be delivered to the input of the adder; this sample appears at another position on the stored waveform, as shown in FIG. 3A. After that signal is delivered to the adder and a certain amount of time has been allowed for settling, the output of the adder is clocked back into the other input of the adder after having been divided by two by clocked latch 50. The sample point X is the interpolation resulting from the first cycle, which falls between sample points #14 and #15 and is displaced from the stored waveform. At the conclusion of this first cycle PISO register 44 delivers the next most significant of the seven bits which, in turn, selects either a "previous" sample or a "next" sample (depending, as before, on whether its value is a zero or a "1," respectively) and that sample is then delivered via multiplexer 46 to the first input of adder 48, and following a predetermined settling time, during which the sample is added to the last previous value divided by two, is clocked into latch 50 and coupled to the other input of the adder. In this example, the "next" sample #15 would have been selected and the approximation based upon sample X and sample #15 to produce the sample point designated Y. This process is repeated for each of the five remaining of the seven least significant bits, and at the conclusion of the seventh cycle, the output of adder 48 is a completed sample, which is clocked into "completed sample" latch 52. Thus, it is seen that the difference in the values of sample Nos. 14 and 15 (in this example) is interpolated to seven bits such that the completed sample represents, with a high degree of accuracy, the value of a sample lying between sample Nos. 14 and 15, but closer to No. 15, as called for by the phase information then present in phase accumulator 40. This process is repeated for each of the stored sample points (i.e., with seven-bit interpolation for each) under control of the changing phase information contained in accumulator 40.

The operation just described is similar to that of a barrel multiplier previously used in microprocessors, but differs in the important respect that in the classic barrel multiplier the value of the smaller of the two interpolated sample values would be forced to be zero; if the value of the lower valued sample (No. 14 in the example) in the present system were forced to be zero the desired interpolation would not result. As has been noted earlier, the described modification of the known barrel multiplier to achieve interpolation between successive amplitude samples to obtain a close approximation of the stored waveform provides a very much better waveshape-type generator than is obtainable by conventional techniques. Also, the improved performance is obtained with a memory capacity usually required for the known digital-to-analog method which, by virtue of the interpolation to seven bits, effectively has 32,768 sample points.

In the description thus far of the waveform generator it has been assumed that it is capable of producing only one output waveshape at a time; however, the preferred embodiment has the capability of simultaneously generating thirty-two waveshapes, that is to say, the system embodies thirty-two logical oscillators like the one just described. To accomplish this, phase RAM 40 contains thirty-two different phase accumulators and waveform memory 42 has thirty-two output address registers. The address for phase RAM 40 is generated by an 8-bit counter included in computer 18 which counts through 256 states. Eight of the 256 available states are used to service a given oscillator; thus, the 256 states or clocks can service thirty-two notes and provide thirty-two separate logical oscillators. The upper five bits of each group of eight clocks specify the number of the generator being serviced.

The completed samples produced at the output of latch 52, each sample being represented by a 12-bit word, is coupled to a 12-bit digital-to-analog converter 54, the analog output of which, after suitable amplification by an amplifier 56, is coupled to a first input of a multiplying digital-to-analog converter (MDAC) 58; the second input is an 8-bit word coupled from the output of the amplitude latch 60 of an envelope waveshape generator 62. The envelope waveshape generator 62 serves to impart a proper amplitude envelope to the analog waveshape signal. Selection of the envelope waveshape is carried out by manually operating musical tone selector switches provided on the console of the instrument which, in turn, causes computer 18 to deliver keydown signals to envelope generator 62 to cause the same to output the appropriate envelope waveshape to the multiplier 58. According to another aspect of the present tone generating system, instead of using a single multiplying DAC, as has been conventional, the MDAC 58 is cascade connected with a second multiplying DAC 60; that is, the output of MDAC 58, after amplification, is applied to one input of the second MDAC 60, the second input of which is also connected to receive the 8-bit word output of envelope generator 62.

The function of the muliplying DAC in this application is to multiply by a fraction, so as to serve as an attenuator for the analog signal applied to its first input, the degree of attenuation being controlled by a factor (digital word) applied to its second input. Designating as "W" the raw analog waveform from DAC 54, that waveform is scaled by the amplitude envelope from envelope generator 62, which in the preferred embodiment is represented by an 8-bit value designated "N", which gives a scaling constant of 256. Accordingly, the output of multiplying DAC 58, designated $V_0$, is equal to $W \times N \div 256$ or $N/256 \sin \omega t$. This signal is applied to the first input of the second multiplying DAC 60 and multiplied by the scaling factor "N", with the result that the amplitude of its output signal, $V_1$ is $(W \times N/256)(N/256)$ or $N^2/65536 \sin \omega t$. Thus, by cascading two multiplying DAC's, the attenuation factor is squared, thus greatly enhancing the amplitude resolution of the system. For example, if only a single 8-bit multiplying DAC were used there would be only eight bits of amplitude resolution, whereas the use of cascaded multiplying DAC's provides sixty-four bits of amplitude resolution. In other words, the use of the second multiplying DAC achieves a greater degree of amplitude resolution without the need for components any more complex than an 8-bit number to control it; this is significant because an 8-bit number is much easier to calculate than a 16-bit number, particularly in a system controlled by an 8-bit microprocessor, such as the Z-80 preferably used in the system.

The importance of improved amplitude resolution will be evident from comparison of the waveforms shown in FIG. 3B, the upper of which is an idealized representation of a waveform that is asymptotically approaching zero amplitude and the lower is an example of a stepped approximation of the approach towards zero, as occurs in a digital tone generator. The object, of course, is to reduce to the extent practicable the height of the steps between successive amplitude levels in the decaying portion of the waveform, better to approximate the ideal. The table of FIG. 4, which shows attenuation in dB and amplitude in millivolts for the signals $V_0$ and $V_1$ for various values of N, demonstrates the much finer gradation of amplitude levels obtained by using two multliplying DAC's in cascade than when only one is used.

As has been noted, the analog output signal delivered by a multiplying DAC is equal to the product of a digital number (in this case, the amplitude value represented by "N") and an analog voltage or current which, in the case of DAC 58, is the analog voltage delivered by DAC 54. Since the MDAC's perform digitally controlled gain adjustment on an analog signal, their function is that of a digitally controlled attenuator. A typical MDAC is the AD75XX series, commercially available from Analog Devices consisting of an attenuating ladder network including a set of digitally controlled switches, and a feedback resistor that tracks the ladder-network resistance. A 1978 publication of Analog Devices, Inc. entitled, "Application Guide to CMOS Multiplying D/A Converters," states that the output impedance of a current-mode DAC can generally be treated as a parallel combination of resistance and capacitance, and then goes on to say that the "capacitance combines with the feedback resistance to add a pole to the open-loop response, which may result in poor closed-loop response and desirable results." This capacitance adversely affects the stability and settling time of the multiplying DAC's in the application of FIG. 3, so much so that unless compensating measures are taken the system would not operate acceptably at the extremely high bit rates involved in the system. The solution to this problem proposed by Analog Devices on page fourteen of the aforementioned publication is based on the assumption that because the output has a relatively small voltage compliance it is desirable to convert the current output of the DAC into a voltage, and to do this by using the summing junction of an operational amplifier as a virtual ground to sum into. However, the virtual ground of an operational amplifier is only as good as its output speed, and its input is indeed a voltage—not a current. The operational amplifier operates on a differential voltage between the positive input and the negative input, its high gain serving to maintain the differential voltage very small; however, the differential voltage is real, and the real voltage gain associated with the operational amplifier tends to slow its operation.

Figures 4, 5:
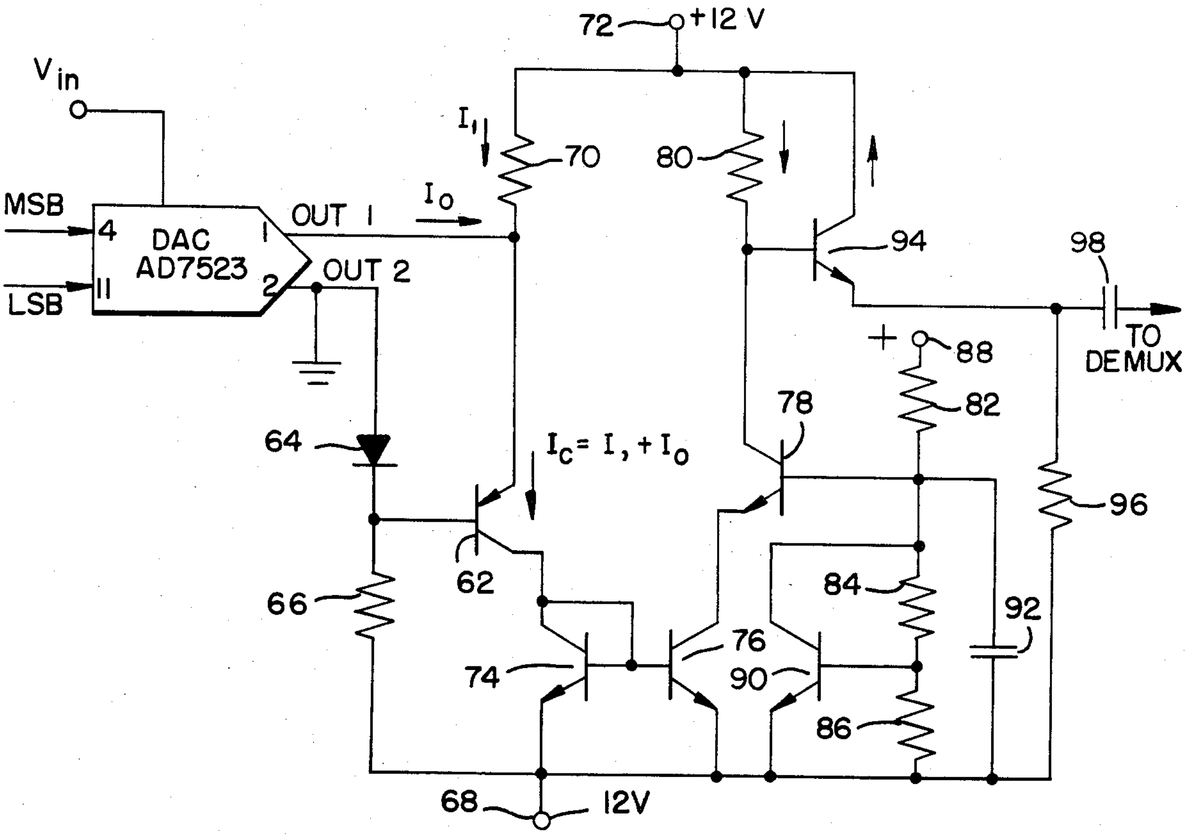
FIG. 4 is a table of numbers which depicts the advantage of cascaded multiplying digital-to-analog converters.
FIG. 5 is a schematic diagram of a circuit for use with a commercially available multiplying digital-to-analog converter to increase its speed of operation.

To overcome the described shortcomings of Analog Devices' Type AD7523 multiplying DAC so as to permit its use in the system configuration of FIG. 3, the outputs of the DAC are treated as current sources and applied to a circuit for converting the current to a voltage without having a large voltage swing at the output of the DAC. Referring to FIG. 5, the analog signal delivered by the first DAC 58, designated $V_{in}$, is applied to the input terminal of the DAC and the digital signal "N" from envelope generator 62 is applied to pins 4 and 11. The current output from pin 1, designated $I_0$, is coupled to the emitter electrode of a PNP transistor 62, the base of which is biased to 0.6 volts below ground by a diode 64 whose anode is connected to the grounded output pin 2 of the DAC, and a resistor 66 connected from the cathode of the diode to a source of negative potential represented by terminal 68, typically having a value of −12 volts. The emitter of transistor 62 is connected via a resistor 70 to a source of positive potential, typically 12 volts, represented by terminal 72. In practice, resistor 70 is the resistor $R_f$ which was intended to form part of the equivalent feedback circuit of the DAC itself, but for purposes of explanation it will here be treated as an external resistor. The current in resistor 70, designated $I_1$, serves as a bias current for transistor 62, and since the emitter of transistor 62 is held approximately at ground by the diode 64 and resistor 66, the current, $I_c$, flowing through the collector of transistor 62, is $I_1+I_0$. This current flows into the collector of an NPN transistor 74, the emitter of which is connected to the negative voltage terminal 68. The collector and base electrodes of transistor 74 are both connected to the base electrode of an NPN transistor 76 which serves as a current mirror for changing the polarity of the signal so as to get a voltage gain out of it. By matching transistors 74 and 76, the same current flows in the collector of transistor 76 as in the collector of transistor 62, that is to say, the current $I_c$; transistors 74 and 76 are conveniently matched by using two of a package of five matched transistors of the commercially available transistor array Type 4186.

Another NPN transistor 78 having its emitter connected to the collector of transistor 76, its collector connected via a resistor 80 to positive voltage source 72, and its base electrode connected to a voltage divider including resistors 82, 84 and 86 serially connected between a source of positive potential represented by terminal 88 and the source of 68 of negative potential, functions as a cascode amplifier. The base electrode of transistor 78 is held at a constant voltage by a voltage source consisting of an NPN transistor 90 whose emitter is connected to negative potential source 68, and the collector and base electrodes of which are connected to the base of transistor 78 and to the junction of resistors of 84 and 86, respectively; the value of the voltage is stabilized by a capacitor 92 connected in parallel with the series-connected resistors 84 and 86. Holding the voltage on the base of transistor 78 at a constant level permits a large voltage swing on its collector which is not degraded by the Miller collector-to-base capacitance, which is multiplied by voltage gain. Thus, by fixing the base voltage of transistor 78 and allowing its emitter to float with changes in level of $I_c$, no charge is allowed to be driven into the collector/emitter junction of transistor 78 and, accordingly, the collector is free to rise at a great rate of speed.

The collector of transistor 78 is connected to the base of an NPN transistor 94 connected as an emitter follower for lowering the output impedance of the circuit; the collector of transistor 94 is connected to positive voltage source 72 and its emitter is connected to a coupling capacitor 98 for coupling the output signal to a multiplexer (to be described) and also via a resistor 96 to negative voltage source 68. If now it is considered that resistor 70 is internal of DAC 60, the current $I_0$ is fed into resistor 80 causing the sum of $I_0$ and $I_1$ to flow in resistor 80; the described circuit converts $I_0$ into a voltage swing on the collector of transistor 78 which is then buffered from a low impedance by the emitter follower 94, to be passed on to the next stage. The circuit has a voltage settling time of the order of 20 nanoseconds, as compared with the usual two or three microseconds settling time of an operational amplifier; thus, the described circuit is capable of operating more than a hundred times faster than an operational amplifier and is essential to the operation of the overall tone signal generator. Without this kind of speed it would have been impossible to time division multiplex or demultiplex the outputs of the thirty-two logical "oscillators" contained in the system.

Reverting now to FIG. 3, the output from the circuit of FIG. 5, which consists of up to as many as thirty-two time division multiplexed tone signals, is applied to a demultiplexer 100 which, under control of an output address logic 102 responsively to information derived from amplitude latch 60, decodes the multiple tone signals and delivers them at the appropriate one of thirty-two different output terminals or channels. Each output channel includes a respective amplifier 104, 106, 108, 110 . . . , the outputs of which are suitably combined and coupled to a sound system. For example, the output signals in the odd-numbered channels 1, 3, 5 . . . etc. may be added together in an analog adder 112, and after suitable amplification, applied to a first loudspeaker 114, and the outputs of the even-numbered channels 2, 4, 6, etc. combined in a second adder 116 and after amplification applied to a second loudspeaker 118. However, it will be understood that the multiple output channels may be combined in ways other than that shown and just described. For example, more than two analog adders may be used, and the output of a given channel may be applied to two or more different adders; that is, any given output channel may ultimately be reproduced by more than one loudspeaker. Also, more loudspeakers than the two shown may be used, and the output channels combined in a choice of different ways for application to the multiple loudspeakers.

For convenience and in order to clarify the operation and to demonstrate the versatility of the invention, it has been described in the context of an electronic organ. It will be apparent, however, that the invention may be applied to other forms of single-note or multiple-note instrument in which the digital data representing a desired note is generated within the instrument.

In describing details of the design and operation of the instrument, values have been indicated for parameters such as process times, store capacities and numbers of channels. Such values are intended only to indicate current practice and not as introducing any restriction on the scope of the invention.

I claim:

1. A digital signal generator for musical notes comprising:

keyboard means including stop means for producing first selection signals each of which indicates the selection of a defined set of harmonic structures, and key means for producing second selection signals each of which indicates the selection of a note having a predetermined pitch and a predetermined harmonic structure, memory means for storing a plurality of digital samples representing a waveform having a selected harmonic structure, digital computer means for sampling the samples stored in said memory means in response to said second selection signals including barrel interpolator means controlled by said digital computer means for repetitively interpolating between successive samples read from the waveform stored in said memory means and producing a completed sample output which represents more accurately than does either of such successive samples a point on the stored waveform instructed by the second selection signal, said barrel interpolator means comprising a digital adder having a first input connected to receive samples read from the waveform stored in said memory means, a first latch under clock control connected between the output and a second input of said adder for dividing an output sum signal by two and coupling the resulting signal to the second input of said adder, and a second latch connected to receive the output of said adder for producing said completed sample output following a predetermined number of interpolation cycles, and means for converting the completed samples produced by said barrel interpolator means into an analog output signal.

2. A digital signal generator according to claim 1 wherein said means for sampling further includes a source of digital values representative of phase angle increments, a clocking means connected to said source for clocking out to a register said digital values at a fixed clocking rate, a digital binary register connected to said clocking means for accumulating said digital values, and means connecting said register to said memory means.

3. A digital signal generator according to claim 1, wherein said converting means includes an envelope generator controlled by said digital computer means for generating digital signals representing amplitude values of a composite waveform, means connected to receive the output of said second latch for converting said completed samples to analog form and for assigning a relative amplitude value to each completed sample, said means including a digital-to-analog converter responsive to the output of said second latch for producing an analog signal, first and second cascade-connected multiplying digital to analog converters the first of which is connected to receive said analog signal and both of which are connected to receive said digital signals from said envelope generator, and means for coupling signals from the output of said second multiplying digital-to-analog converter to audio reproduction means.

4. A digital signal generator according to claim 3, wherein said cascade-connected multiplying digital-to-analog converters are the equivalent of the Type AD7523 multiplying digital-to-analog converter and have first and second outputs, and wherein said means for coupling signals from the output of said second multiplying digital-to-analog converter comprises:

circuit means connected to receive and responsive to the current appearing at the first output of said second multiplying analog-to-digital converter for converting the current to a voltage and thereby enhancing the speed of operation of the digital signal generator.

5. A digital signal generator for musical notes comprising:

digital computer means having first input means including a plurality of stops for producing first selection signals each of which indicates the selection of a set of harmonic structures, and second input means including a plurality of keys for producing second selection signals each of which indicates the selection of a note having a predetermined pitch and a predetermined harmonic structure, memory means for storing a first plurality of digital samples representing a waveform having a selected harmonic structure, means including a source of digital values representative of phase angle increments controlled by said digital computer means and responsive to a change in said second selection signals for sampling the sample stored in said memory means at a fixed clocking rate for selecting a note, and further including interpolator means for repetitively interpolating between successive samples read from the waveform in said memory means and producing a completed sample output which represents more accurately than does either of such successive samples a point on the stored waveform instructed by the second selection signals, said interpolator means comprising a barrel interpolator including a digital adder having a first input connected to receive samples read from the waveform stored in said memory means, a first latch under clock control connected between the output and a second input of said adder for dividing an output sum signal by two and coupling the resulting signal to the second input of said adder, and a second latch connected to receive the output of said adder for producing said completed sample ouput following a predetermined number of interpolation cycles, and means for converting the completed samples produced by said interpolator means into an analog output signal.

6. A digital signal generator according to claim 5, wherein said converting means comprises:

an envelope generator under control of said digital computer means for generating digital signals representing amplitude values of a composite waveform, a first digital-to-analog converter connected to receive and responsive to the output of said second latch for converting said completed samples to analog form and producing an analog signal, cascade-connected first and second multiplying digital-to-analog converters, the first of which is connected to receive said analog signal and both of which are connected to receive said digital signals from said envelope generator, and means for coupling the signals from the output of the second of said multiplying digital-to-analog converters to audio reproduction means.

7. A digital signal generator for musical notes comprising:

digital computer means, memory means for storing a first plurality of digital samples representing a waveform having a selected harmonic structure, means including a source of digital values representative of phase angle increments controlled by said digital computer means for sampling the sample stored in said memory means at a fixed clocking rate for selecting a note, and further including interpolator means for repetitively interpolating between successive samples read from the waveform in said memory means and producing a completed sample outlet, said interpolator means comprising a barrel interpolator including a digital adder having a first input connected to receive samples read from the waveform stored in said memory means, a first latch under clock control connected between the output and a second input of said adder for dividing an output sum signal from the adder by two and coupling the resulting signal to the second input of said adder, and a second latch connected to receive the output of said adder for producing, following a predetermined number of interpolation cycles, said completed sample output, and means for converting the completed samples produced by said interpolator means into an analog output signal.

8. A digital signal generator according to claim 7 wherein said converting means comprises:

an envelope generator controlled by said digital computer means for generating digital signals representing amplitude values of a composite waveform, a first digital-to-analog converter connected to receive and responsive to the output of said second latch for converting said completed samples to analog form and producing an analog signal, cascade-connected first and second multiplying digital-to-analog converters, the first of which is connected to receive said analog signal and both of which are connected to receive said digital signals from said envelope generator, and means for coupling the signals from the output of the second of said multiplying digital-to-analog converters to audio reproduction means.

* * * * *